United States Patent [19]
Blumenthal

[11] 3,796,482
[45] Mar. 12, 1974

[54] FLEXIBLE ROD FOR SPECTACLE FRAMES
[75] Inventor: Oreste Blumenthal, Turin, Italy
[73] Assignee: S.p.A. Giuseppe Ratti Industria Ottica, Turin, Italy
[22] Filed: Feb. 24, 1972
[21] Appl. No.: 229,037

[30] Foreign Application Priority Data
Apr. 24, 1971  Italy .................. 68365/71

[52] U.S. Cl. .................. 351/114, 351/117
[51] Int. Cl. .................. G02c 5/16, G02c 5/18
[58] Field of Search .................. 351/114, 117, 178

[56] References Cited
UNITED STATES PATENTS
| | | | |
|---|---|---|---|
| 3,582,194 | 6/1971 | Liautaud | 351/114 X |
| 3,627,406 | 12/1971 | Blumenthal | 351/117 |
| 3,052,160 | 9/1962 | Ratti | 351/117 |

FOREIGN PATENTS OR APPLICATIONS
| | | | |
|---|---|---|---|
| 542,876 | 1/1942 | Great Britain | 351/114 |

Primary Examiner—Paul A. Sacher
Attorney, Agent, or Firm—Ladas, Parry, Von Gehr, Goldsmith & Deschamps

[57] ABSTRACT

This invention provides an improvement in a spectacle frame of relatively rigid material comprising a front part and side pieces hinged thereto and having at least one flexible portion formed by a chain having elements mutually articulated and held together by a flexible inner core passing through said chain, said elements comprising alternating small members provided with two opposite portions of spherical surface, one portion of spherical surface of each member facing a corresponding portion of spherical surface of an adjacent member and said two facing surfaces of two adjacent members being one a convex spherical surface and the other a concave spherical surface.

3 Claims, 13 Drawing Figures

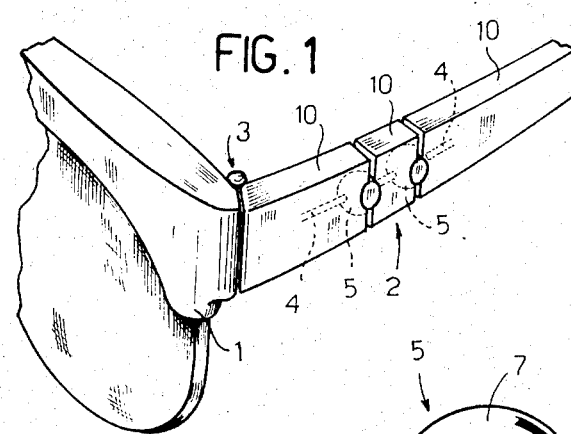
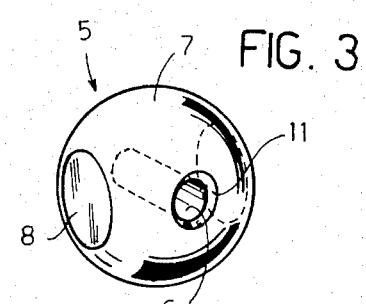
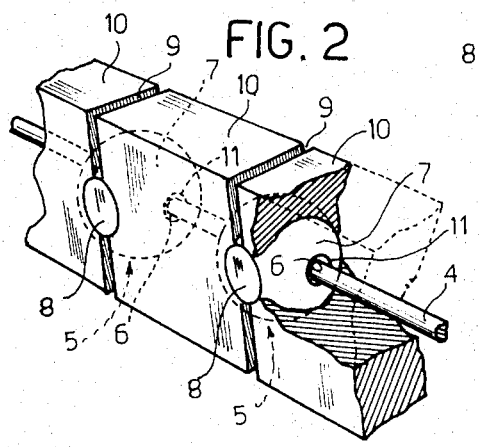
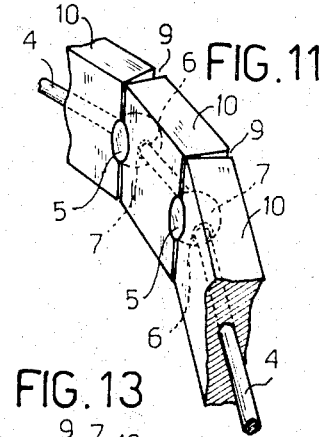
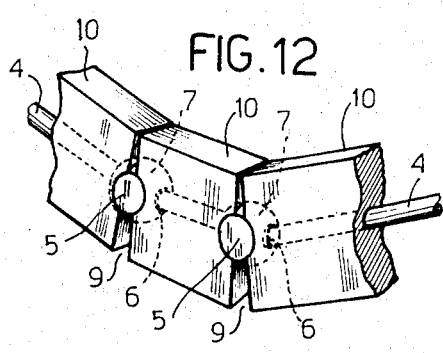
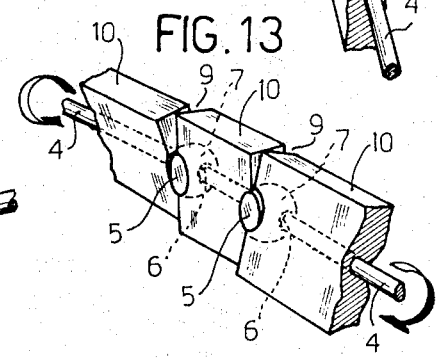

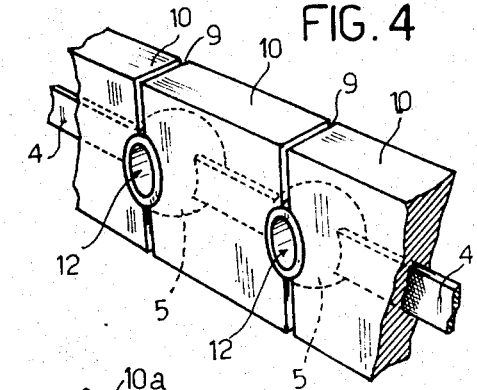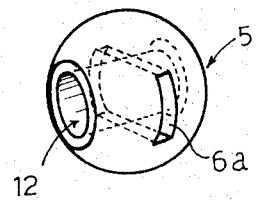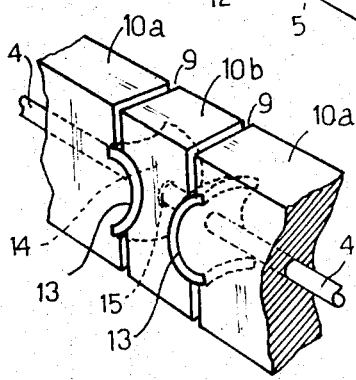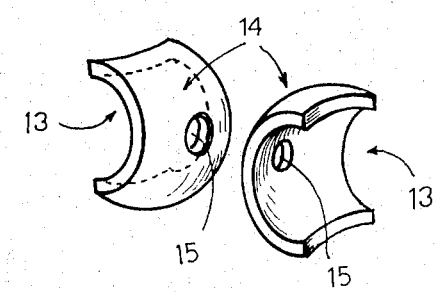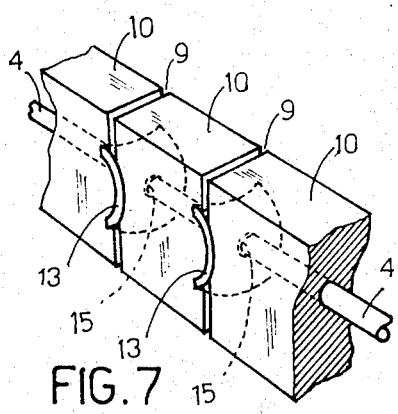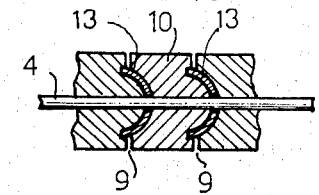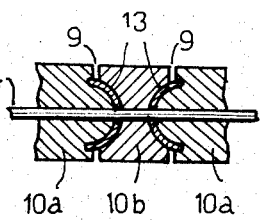

FLEXIBLE ROD FOR SPECTACLE FRAMES

This invention relates to a flexible member of spectacle frames and, more particularly, to a flexible rod or side bar having a high flexibility in any plane passing through the axis thereof and which simultaneously allows a certain rotation of the free end of the same relative to the other end secured to the front of the spectacle frame.

Flexible rods or side bars for spectacle frames are already known, normally made of synthetic material and substantially comprising a plurality of small blocks adjacent to one another and separated from one another by a slot, said small blocks being passed through by a metallic core disposed inside the rods. According to this constructional solution, a certain flexibility is imparted to the rod core in correspondence with said slots and, therefore, during bending of the rod a relative displacement of each small block with respect to the adjacent ones occurs.

However, the rods of spectacle frames of the kind just described suffer from the drawback due to the fact that the core of the rod remains exposed and therefore subjected to the action of weathering or other agents which can easily cause corrosion of the same. This disadvantage is particularly noticeable in the case when the width of said slots is particularly large in order to attain a high flexibility of the rod or side bar; in fact, in this instance foreign matters can more easily come in contact with the rod core through said slots.

Flexible rods for spectacle frames are also known, comprising substantially a plurality of small blocks between which a number of cylindrical elements or members are alternately disposed. The surfaces of said small block, cooperating with the aforementioned cylindrical members also are of cylindrical shape and both the former and the latter are passed through by the metallic core which is disposed inside the rod. In this instance, during bending of the rod or side bar a relative rotation of said small blocks with respect to the cylinders occurs, as well as a sliding movement between the surfaces of the latter coupled together.

Even though with the rods of this second kind the disadvantage inherent to the rods of the first-mentioned kind is obviated, these rods allow, however, to accomplish bending of the side bar solely in a single plane normal to the axis of the cylindrical members mentioned above. It is preferable that the rod of a spectacle frame should allow a high flexibility in any plane passing through the axis of the same rod; further, it has been found that, in order to attain a greater adaptability of the spectacle frame to the face of the wearer, it is advisable that the free ends (or terminals) of the rods or side bars might easily accomplish rotational movements relative to the opposite ends of said rods which are secured to the front of the spectacle frame, normally by means of hinges.

The object of the present invention is to provide a flexible rod for spectacle frames, which enables to avoid the disadvantages enumerated above and, more particularly, a flexible rod whose free end can be easily rotated with respect to the end connected with the front of the spectacle frame.

The rod or side bar in accordance with the invention, comprising an inner core and an outer covering, is characterized in that it comprises at least one member or element provided with a convex spheric surface and an element provided with a concave spheric surface coupled therewith, said elements being held united by the core passing through them and adapted to rotate relative to one another when said core is deformed by bending or twisting.

For a better understanding of the present invention some particular embodiment thereof will now be described, merely by way of non-limiting example, with reference to the accompanying drawings, wherein:

FIG. 1 is a perspective view of one rod of spectacle frame in accordance with one first embodiment of the present invention, connected with the front of the frame;

FIG. 2 is a perspective view, on an enlarged scale, of a portion of the flexible rod of FIG. 1;

FIG. 3 is a perspective view of a spheric element forming part of the flexible rod of the embodiment of FIGS. 1 and 2;

FIG. 4 is a perspective view of a portion of a flexible rod according to a second embodiment of the present invention;

FIG. 5 is a perspective view of a spheric element forming part of the flexible rod of the embodiment of FIG. 4;

FIGS. 6 and 7 are perspective views of one portion of two further embodiments of the flexible rod according to the invention, respectively;

FIG. 8 is a perspective view of a pair of spheric shells forming part of the rod of the embodiment illustrated in FIG. 6;

FIGS. 9 and 10 show, in section, the embodiments of FIGS. 6 and 7, respectively, and FIGS. 11, 12 and 13 diagrammatically show the portion of rod of FIG. 2 in three different deformed configurations.

Referring first to FIGS. 1 and 2 of the drawings, a spectacle frame (FIG. 1) is provided with a flexible rod 2, connected with the front of the frame by means of hinge means 3 and having the shape of a bar of substantially rectangular cross section.

Preferably, the flexible rod 2 is made of a synthetic material, such as celluloid or a thermoplastic resin (for instance cellulose acetate) or of metal also; said rod is passed through, in a longitudinal direction, by a core 4 which, in the embodiment shown in FIGS. 1 and 2, is of substantially circular cross section. The core 4 is preferably of metal but can be also made of any other resilient material.

In a portion whatever of said rod 2, preferably in the portion closest to the hinge 3, there is disposed a plurality of spheric elements 5, each of which is provided with a hole 6 passed through by the core 4 of the rod. Each spheric element 5 is defined externally by a substantially spherical surface 7 and by a pair of flat surfaces 8, opposite and parallel to one another. The extension of the surfaces 8 can be chosen as desired, or said surfaces can be omitted, whereby the spheric elements 5 will be defined solely by a spherical surface.

In the case of the embodiment illustrated in FIGS. 1 and 2, the rod 2 comprises a pair of spherical elements 5 only; however, the number of these elements can be as desired. Said elements can be disposed so as to have the surfaces 7 tangent to one another or at some distance from one another; these elements are completely inserted inside the material comprising the flexible rod 2, so that the spherical surface 7 of each of them will coact with a corresponding spherical surface of the material of said rod 2 coupled therewith. A pair of slots 9, provided in the material of the rod 2 which surrounds the spheric elements 5, will expose the spherical surface 7 of each element, so as to separate — between two adjacent spheric elements 5 — small blocks 10 formed by the same material of the rod 2.

Therefore, the rod just described will comprise a plurality of spheric elements 5 having interposed therebetween a number of small blocks 10 with opposite spherical surfaces cooperating with the spherical surfaces 7 of said spheric elements 7. Both the spheric elements 5 and the small blocks 10 are passed through by the core 4 which holds them united together, thereby preventing separation of the same, what would be possible in the absence of the core 4 on account of the slots 9. It should be born in mind that the spherical surfaces of the small blocks 10, cooperating with the corresponding spherical surfaces of the elements 5, are not located to the latter, but that a sliding movement of the former relative to the latter is possible.

Preferably, the spheric elements 5 can be made of metal or of a synthetic material, for instance a thermoplastic material, like the rod or side bar 2.

Suitably, in correspondence with the ends of each hole 6 in the spheric elements 5 (FIG. 3), conical flarings 11 are provided, so as to obtain a certain clearance between the core 4 and the surface of the flarings in the aforementioned hole. Instead of in the holes 6, said flarings 11 can be provided in the small blocks 10 close to said holes, or either on the small block or on the spheric elements 5. Alternatively, the holes 6 in the elements 5 or the holes in the blocks 10, passed through by the core 4, have a diameter greater than that of said core, so as to leave a certain clearance between the inner surface of the hole and that of the core.

The operation of the flexible rod described above is as follows.

Assume first to grasp the end of the flexible rod 2, by tending to displace the same in a direction perpendicular to that of its axis, that is to say in a direction orthogonal to the axis of the core 4. Upon said displacement, a flexion or bending of said core 4 will occur in the areas which are in correspondence with the spherical surfaces of the spheric elements 5 and the small blocks 10 coupled together. This bending is permitted due to the provision of the aforementioned conical flarings 11 as well as by the small clearances existing, in practice, between said coupled surfaces. In the absence of said flarings 11, said bending is allowed by the radial clearance or side play mentioned above, existing between the holes in the elements 5 or the small blocks 10, and the core 4. Therefore, during bending of the core 4 a relative rotation of the small blocks 10 with respect to said spheric elements 5 will occur, namely in the plane where said bending of the core 4 takes place. Owing to this relative rotation, a sliding movement between said surfaces coupled together can occur, due to the provision of the slots 9.

As soon as the external action applied to the free end of the rod 2 ceases, said rod will resume its original configuration shown in FIG. 1 by the effect of the elasticity of the core 4.

It should be noted that the flexion of said rod can occur in any plane. In particular, if said flexion occurs in the plane where both axes of the two rods of the spectacle frame lie, then a deformation such as that shown in FIG. 11 will be obtained, whereas if the flexion occurs in a plane perpendicular to that containing said axes, then the deformation will be of the kind shown in FIG. 12. In the first instance, the faces of each slot 9 will take substantially a V-shaped configuration, whereas in the second instance the faces of said slots 9, which are in correspondence with the upper side of the rod, will tend to approach parallel to one another, whilst the faces in the lower side will tend to come apart. If a torsion is applied to said rod, due to a torsion of the core 4, then the small blocks 10 and the elements 5 will rotate relative to one another about the axis of said core, as seen in FIG. 13. This rotation can be utilized to easily adapt the rod 2 to the face of the wearer of the spectacle frame.

The spheric elements 5 can also have a shape different from that of the embodiment illustrated in FIGS. 1 and 2. In the embodiment shown in FIG. 4, each element 5 is provided with a hole 12 whose axis is substantially orthogonal to one of the side faces of the rod 2. Preferably, said hole can be filled with any material suited to form an ornamental element for said rod. The spheric element constructed in the manner described above is shown in FIG. 5. This element might also be comprised of a hollow ball provided with holes 12.

In the embodiment of the invention illustrated in FIG. 4 the core 4 has a rectangular instead of a circular cross section. This constructional solution can be chosen when it is desired to impart to said rod a different flexibility in two main planes perpendicular to one another. In fact, in the case of the embodiment shown in FIG. 4, the flexibility of the rod or side bar in the plane containing the axes of the two rods of the spectacle frame is well greater than the flexibility in a plane perpendicular thereto.

In the embodiment of FIG. 4 also, between the metallic core 4 and the perforation 6a of the elements 5 an adequate clearance can be left, so as to allow flexion of said core 4 in correspondence with the spheric elements 5. Alternatively, flarings similar to the flarings 11 shown in FIG. 3 can be provided.

Instead of utilizing spheric elements 5 of the kind illustrated in FIGS. 1 through 5, comprising a spheric segment, it is possible ti utilize — as illustrated in FIGS. 6, 7, 8, 9 and 10 — shells 13 comprising a portion of spherical surface 14 whatever. Said shells 13 are also provided with holes or perforations 15 (FIG. 8) and are passed through by the core 4 of the rod; they are disposed side by side, so as to have their convexity facing towards the same side (as in the embodiment illustrated in FIG. 7), or towards opposite sides (as in the case of the embodiment shown in FIG. 6). In correspondence with each shell, slots 9 are further provided in the material of the rod, so as to define a small block 10 between two adjacent shells.

It will be apparent that, when spherical shells of the kind just described are utilized, it is possible to choose at will both their number and their disposition, as well as the orientation thereof with respect to the small blocks 10, in order to obtain configurations such as those shown in FIGS. 6 and 7.

The shells 13 can be made of any suitable material, preferably of metal or synthetic material, for instance a thermoplastic material.

Obviously, many modifications and variations can be introduced in the embodiments of the present invention described above, concerning both the shape and the arrangement of the various parts and components, without departing from the scope of the invention.

In particular, while the flexible element or member has been utilized for the manufacture of rods for spectacle frames, it can be also utilized to impart a flexibility to any other part of a spectacle frame, such as for instance the front bridge or the nose of said frame.

What we claim is:

1. In a spectacle frame of relatively rigid material comprising a front part and side pieces hinged thereto and having at least one flexible portion formed by a chain having elements mutually articulated and held together by a flexible inner core passing through said chain, said elements comprising alternating small members provided with two opposite portions of spherical surface, one portion of spherical surface of each member facing a corresponding portion of spherical surface of an adjacent member and said two facing surfaces of two adjacent members being one a convex spherical surface and the other a concave spherical surface.

2. A spectacle frame as claimed in claim 1, wherein said elements comprise balls.

3. A spectacle frame as claimed in claim 1, wherein alternate elements are spherical shells of material different from the material of the members interposed between them.

* * * * *